6/10/86 OR 4,594,496

United States Patent [19]

Bebber et al.

[11] Patent Number: 4,594,496

[45] Date of Patent: Jun. 10, 1986

[54] APPARATUS FOR INTRODUCING IONIZABLE GAS INTO A PLASMA OF AN ARC BURNER

[75] Inventors: Hans J. Bebber; Heinrich-Otto Rossner; Gebhard Tomalla, all of Essen, Fed. Rep. of Germany

[73] Assignee: Fried. Krupp Gesellschaft mit beschränkter Haftung, Essen, Fed. Rep. of Germany

[21] Appl. No.: 550,127

[22] Filed: Nov. 9, 1983

[30] Foreign Application Priority Data

Nov. 10, 1982 [DE] Fed. Rep. of Germany ....... 3241476

[51] Int. Cl.[4] .................................................. B23K 9/00

[52] U.S. Cl. ........................ 219/121 PP; 219/121 PQ; 219/121 PR

[58] Field of Search .................... 219/121 PP, 121 PQ, 219/121 PR, 75, 121 PM

[56] References Cited

U.S. PATENT DOCUMENTS

| | | | |
|---|---|---|---|
| 3,147,329 | 9/1964 | Gage . | |
| 3,347,766 | 10/1967 | Death et al. . | |
| 3,644,782 | 2/1972 | Sheer et al. | 219/121 PR X |
| 4,390,772 | 6/1983 | Hiratake | 219/121 PQ |

*Primary Examiner*—Clarence L. Albritton
*Assistant Examiner*—M. M. Lateef
*Attorney, Agent, or Firm*—Spencer & Frank

[57] ABSTRACT

A plasma burner for introducing an ionizable gas stream into an electric arc comprises a nozzle having an outlet opening for discharging the gas stream. The outlet opening is defined by an outlet part of the nozzle; the outlet part has an inner nozzle face conically tapering, at an acute first cone angle, in a direction of the outlet opening. The plasma burner further has an electrode surrounded by the outlet part and having an outer electrode face conically tapering, at an acute second cone angle, in the direction of the outlet opening. The inner nozzle face and the outer electrode face together define a conical annular channel.

17 Claims, 4 Drawing Figures

APPARATUS FOR INTRODUCING IONIZABLE GAS INTO A PLASMA OF AN ARC BURNER

BACKGROUND OF THE INVENTION

This invention relates to plasma torch (plasma burner) for introducing an ionizable gas into an arc burner to produce a plasma. The arc burner is provided with an electrode (which may be liquid-cooled) situated within a nozzle (which also may be liquid-cooled) guiding an ionizable gas into the arc and having a constricted outlet into which the tip of the electrode extends. The invention further relates to a plasma burner fo performing the method.

Plasma burners of the above-outlined type are known by themselves. A long service life of the electrode and nozzle of such plasma burner is of particular importance. The problems involved with these components become pronounced particularly in cases where relatively large arcs (having a length substantially in excess of 200 mm) are used and where the atmosphere surrounding the burner contains gases which may corrode (for example, oxidize) the electrode. Such adverse circumstances often occur, for example, in metal melting furnaces which operate with plasma burners. In such an environment it is often a requirement that the arcs burn securely, that is, without the risk of arc interruption even in case of very substantial arc lengths, for example, up to and in excess of 700 mm. To meet this requirement, a very high stability of the plasma arc, also necessary for nozzle durability, has to be ensured. The more unstable the arc, the less it is sharply defined and the greater the risks of the generation of parasite arcs which jump onto the outer nozzle casing and burn towards the melt or the principal arc. Such parasite arcs usually destroy the nozzle instantaneously.

The principal wear for well-cooled electrodes which are made of metals having a high melting point such as molybdenum, tantalum or tungsten, including small quantities of emission materials such as thorium oxide or zirconium oxide resides in the chemical destruction of the electrodes inasmuch as the burners do not operate in an environment which is inert for the electrodes.

Since during the melting of metals mostly oxidic gases are released and residual air still dwells in the furnace chamber, oxidation will take place as a rule. Such an oxidation is, to be sure, reduced by a greater or lesser extent by the inert plasma gas emanating from the nozzle and surrounding the electrode.

Other wear factors such as melting, evaporation and sputtering increase as the temperature increases. For this reason, particularly in case of very high currents, an intensive electrode cooling has to be provided.

For the purpose of cooling electrodes, U.S. Pat. No. 3,147,329 proposes to guide one part of the ionizable gas to the arc through a central opening in the electrode tip which is at the front end of an essentially cylindrical electrode. While by virtue of an additional cooling effected by the central gas stream, an electrode corrosion by high current intensities is reduced, in such an arrangement, however, the electrode is insufficiently protected against chemical corrosion. Further, such an arrangement cannot ensure that long and stable arcs are generated. In case of an alternating current, such burners can be utilized only in a limited manner.

SUMMARY OF THE INVENTION

It is an object of the invention to provide an improved plasma burner which is free from the above-discussed disadvantages and in which the nozzle and the electrode have a long service life even under heavy-duty conditions in scrap melting furnaces operating with alternating or three-phase currents and with arc lengths in excess of 200 mm.

This object and others to become apparent as the specification progresses, are accomplished by the invention, according to which, briefly stated, the ionizable gas is introduced into the plasma of the arc burner as a converging jet having an acute angle defined between the direction of the gas particles in the boundary of the jet and the central axis thereof. The angle is between 6° and 40°, and is preferably 12°.

For performing the method, the plasma burner according to the invention has an electrode which tapers conicaly towards the arc side and which is surrounded by an inner conical face of the nozzle. The outer conical face of the electrode and the inner conical face of the nozzle define, by virtue of their arrangement, an annular channel which shapes the ionizable gas into a conically converging, acute-angle jet and directs it into the arc. It is a requirement in this connection that the facing conical lateral surfaces of the electrode and the nozzle be arranged at least along one portion, preferably in the zone of the electrode tip, parallel to one another, that is, the annular channel formed thereby have a course which tapers towards the arc side. In that portion of the nozzle which projects beyond the frontal side of the electrode towards the arc side, the inner nozzle face may change into a cylindrical configuration. By means of such a shape of the nozzle and the electrode, the gas emanating from the annular channel has a direction which results in decisive improvement of the arc stability and the protection of the electrodes from oxidation.

The cone angle of the frontal terminal portion of the electrode face is, according to a further feature of the invention, between 12° and 60°, while the cone angle of the inner nozzle face is between 12° and 80°. Preferably, each cone angle is 24°.

According to a further feature of the invention, the otherwise planar radial end face of the electrode has a bevel or the electrode is, in the zone of the electrode tip, of concave or convex configuration and is provided with a bevel or with a rounded edge. Dependent upon the size of the plasma burner or the arc intensity, the electrode may have one or more additional channels for guiding therethrough one portion of the ionizable gas.

According to a further feature of the invention, the nozzle has a nozzle sleeve, whose inner surface constitutes the inner nozzle face guiding the ionizable gas. The sleeve is preferably a metal of high melting point, such as molybdenum, tantalum or tungsten. The frontal part of the nozzle, including the nozzle sleeve, may be formed of an insert which is connected with the nozzle by means of casting, welding, soldering, press-fitting or is designed as a removable, screw-in component.

DESCRIPTION OF THE PREFERRED EMBODIMENTS

Figure 1:
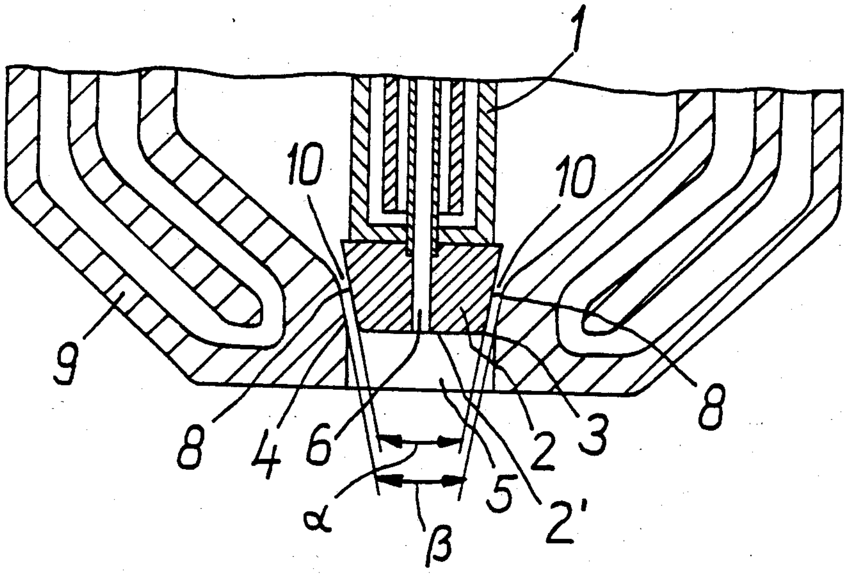
FIG. 1 is an axial sectional view of a first preferred embodiment of the invention.
Figure 3:
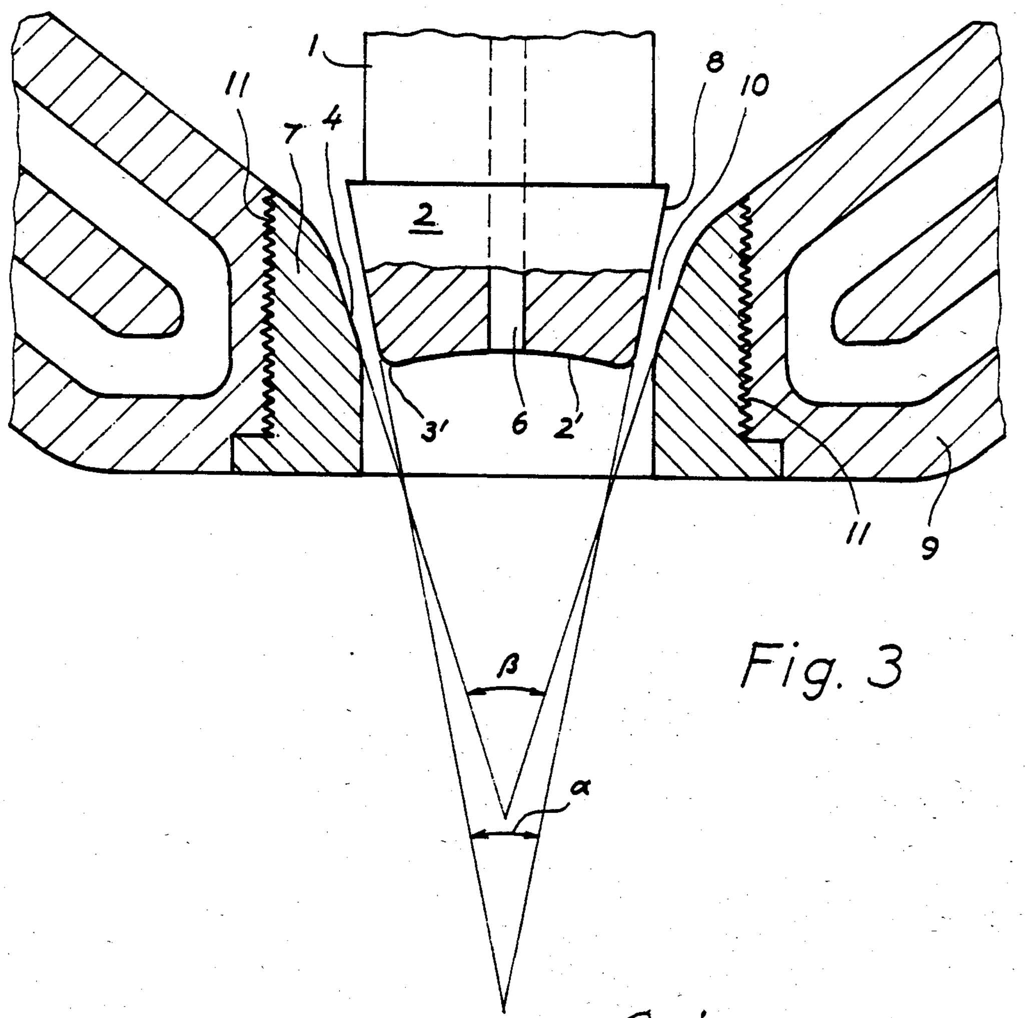
FIG. 3 is a fragmentary axial sectional view of a further preferred embodiment of the invention.
Figure 4:
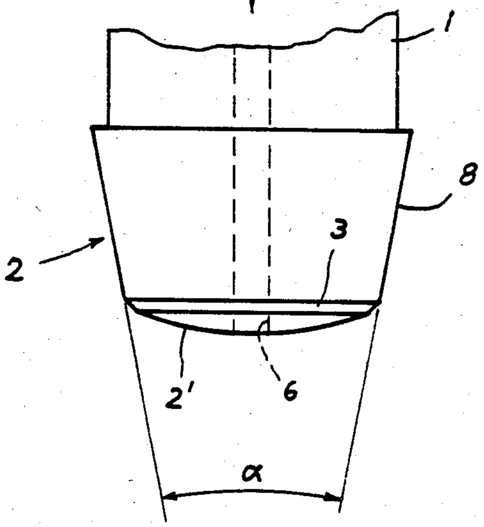
FIG. 4 is a side elevation view of an electrode with a convex end face.

Turning to FIG. 1, the plasma burner shown therein essentially comprises an electrode 2 mounted on a liquid-cooled electrode holder 1. The electrode 2 has the shape of a frustocone tapering towards the end where the arc is formed (arc-side end). The arc-side end face 2' (frontal radial face) of the electrode which is substantially planar, has a circumferential bevel 3. According to another embodiment of this feature the end face 2' of the electrode 2 may also have a concave or convex configuration as illustrated in FIGS. 3 and 4, resprectively. Instead of having a bevel the electrode 2 may also be rounded as indicated at 3' in FIG. 3. The length of the electrode 2 is between 10 and 20 mm. Shorter electrodes have the disadvantage that despite a somewhat slower consumption of electrode material at the end face 2', resulting in shortening the overall length of the electrode, they have to be replaced at an early point in time, while excessively long electrodes become too hot at the arc side and therefore wear faster. The cone angle $\alpha$ of the electrode 2, similarly to the cone angle $\beta$ of the inner face of the nozzle 9 is 24°. The outer face 8 of the electrode 2 is surrounded by the inner face 4 of the nozzle 9, whereby the two faces 4 and 8 define an annular channel 10 whose bounding surfaces in the zone of the electrode tip extend parallel to one another; for higher exit speeds those bounding surfaces 4 and 8 may, in the alternative, be converging in the direction of the arc, i.e. the cone angle $\beta$ is larger than the cone angle $\alpha$, as illustrated in FIG. 3. The annular clearance or channel 10 is so dimensioned that the centrically directed radial component of the exit speed of the ionizable gas passing therethrough is, in the cold condition, between 3 and 17 m/s. The outlet or terminus 5 of the nozzle channel 10 situated beyond the electrode 2 is, in the described embodiment, of cylindrical configuration; in the alternative, it may be of conical shape.

By means of the above-described structure of the nozzle 9 and the electrode 2 the gas passing through the annular clearance 10 has a direction which, as it has been found in the course of numerous tests, has a decisive improving effect on the arc stability and further provides superior protection of the electrodes from oxidation. Thus, with an alternating current, up to 700 mm long stable-burning arcs could be produced. Electrodes which had a frontal diameter of up to 19 mm have shown no traces of oxidation even after several hours of service.

When electrodes of larger diameter or cross-sectional area are used, for example, for the purpose of increasing the current intensity, it may be expedient to admit one part of the ionizable gas through one or more ports 6 provided in the electrode. Although it was found that merely admitting one part of the ionizable gas through ports in the electrode was insufficient to resolve the object of the invention, the gas jet shaping and orientation according to the invention, combined with the additional admission of the ionizable gas through one or several ports in the electrode results in an advantageous protection of the electrode.

In case no central gas supplying channel 6 is provided, the electrode should preferably be recessed by approximately $\frac{1}{4}$ to $\frac{1}{3}$ of its smallest diameter behind the frontal end of the nozzle channel. This corresponds, for example, in case of a diameter of 20 mm to a distance of 5 to 6.5 mm. In any event, such a distance should not be substantially greater than 6.5 mm because then the cooling losses of that portion of the arc which passes through the channel become excessive and further, risks are high that the arc jumps over to the nozzle and parasite arcs are generated. By virtue of the above-mentioned combination of the gas admission through the annular channel and ports in the electrodes, the ratio of the free channel length to the electrode diameter may be reduced to 1/6 to $\frac{1}{3}$, while the same satisfactory electrode protection is achieved. Thus, even in case of electrode diameters in excess of 40 mm the desired advantages may be accomplished.

In order to preserve the shape of the annular channel 10 even for long service periods, the nozzle, instead of making it conventionally of copper, copper alloys or steel, is provided with an insert made of a metal having a high melting point, preferably tungsten. The insert which forms an inner nozzle sleeve, may be provided by casting, welding, soldering, press-fitting or may be designed as a removable component having a screw connection with the plasma burner.

Figure 2:
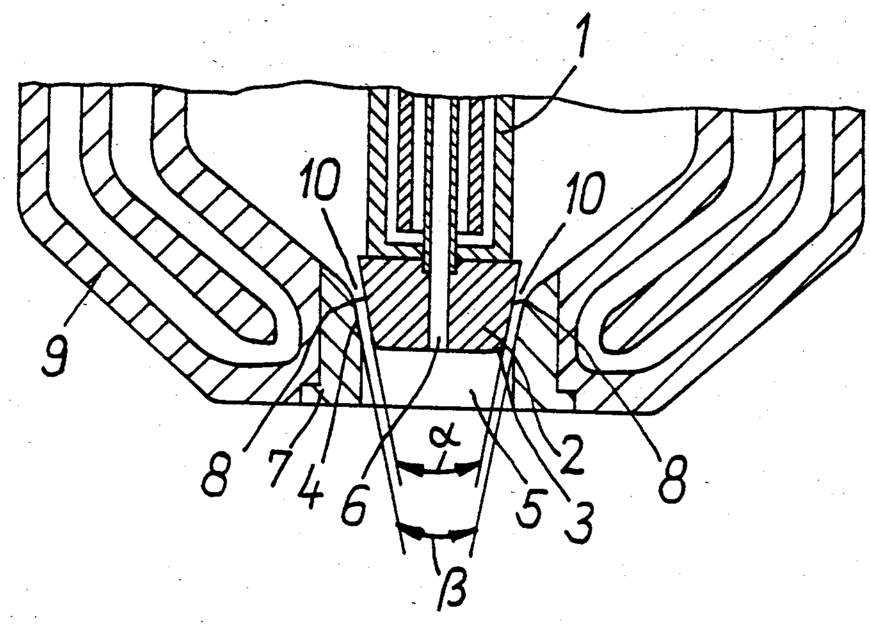
FIG. 2 is an axial sectional view of a second preferred embodiment of the invention.

Turning now to FIG. 2, there is illustrated a nozzle with a tungsten sleeve 7 mounted in the nozzle by a screw connection 11. This arrangement has the particular advantage that a worn nozzle sleeve may be rapidly replaced and thus an exchange of the entire nozzle is not necessary.

It will be understood that the above description of the present invention is susceptible to various modifications, changes and adaptations, and the same are intended to be comprehended within the meaning and range of equivalents of the appended claims.

What is claimed is:

1. In a plasma burner for introducing an ionizable gas stream into an electric plasma arc column, including a nozzle having an outlet opening for discharging said gas stream, said outlet opening being defined by an outlet part of said nozzle; said outlet part having an inner nozzle face conically tapering, at an acute first cone angle, in a direction of said outlet opening; an electrode including a frusto-conical terminal portion surrounded by said outlet part and having an outer electrode face frusto-conically tapering, at an acute second cone angle, in the direction of said outlet opening; said electrode face having a minimum diameter and a circumferential edge at said minimum diameter; and a conical annular channel defined together by said inner nozzle face and said outer electrode face, the improvement wherein said nozzle is a sole nozzle, wherein said acute second cone angle is between 12° and 60°; wherein said circumferential edge surrounds a frontal end face of said electrode, said frontal end face having a generally flat configuration oriented generally radially relative to the outer electrode face; wherein the outlet opening of said nozzle has an area of a full circle substantially at a level of said circumferential edge; and further wherein said circumferential edge is recessed relative to said outlet opening at a distance which is at the most one third the length of said minimum diameter.

2. A plasma burner as defined in claim 1, wherein said distance is at least one fourth the length of said minimum diameter.

3. A plasma burner as defined in claim 1, wherein said electrode includes a least one port opening in a zone of said outlet part within said annular channel to discharge, from said outlet opening, one part of said ionizable gas, and wherein said distance is between one eighth and one sixth of said minimum diameter.

4. A plasma burner as defined in claim 1, wherein said acute first and said second cone angles are identical, whereby said inner nozzle face and said outer electrode face extend parallel to one another.

5. A plasma burner as defined in claim 1, wherein said acute second cone angle is 24°.

6. A plasma burner as defined in claim 1, wherein said acute first cone angle is greater than said acute second cone angle, whereby the space between said inner nozzle face and said outer electrode face is converging in the direction of said outlet opening.

7. A plasma burner as defined in claim 1, wherein said acute first cone angle is between 12° and 80°.

8. A plasma burner as defined in claim 1, wherein said acute first cone angle is 24°.

9. A plasma burner as defined in claim 1, wherein said frontal end face is planar.

10. A plasma burner as defined in claim 1, wherein said frontal end face is concave.

11. A plasma burner as defined in claim 1, wherein said frontal end face is convex.

12. A plasma burner as defined in claim 1, wherein said electrode has as circumferential bevel bounding said frontal electrode end face.

13. A plasma burner as defined in claim 1, wherein the edge defined by said frontal electrode end face and said outer electrode face is rounded.

14. A plasma burner as defined in claim 1, wherein at least said outlet part of said nozzle is a metal of high melting point.

15. A plasma burner as defined in claim 1, wherein said outlet part is a sleeve bonded to said nozzle.

16. A plasma burner as defined in claim 1, wherein said outlet part is a sleeve removably mounted in said nozzle by a screw connection.

17. A plasma burner as defined in claim 1, wherein said inner nozzle face has a cylindrical terminal portion beyond said frontal end face of said electrode.

* * * * *